US007454341B1

(12) United States Patent
Pan et al.

(10) Patent No.: US 7,454,341 B1
(45) Date of Patent: Nov. 18, 2008

(54) METHOD, APPARATUS, AND SYSTEM FOR BUILDING A COMPACT MODEL FOR LARGE VOCABULARY CONTINUOUS SPEECH RECOGNITION (LVCSR) SYSTEM

(75) Inventors: Jielin Pan, Beijing (CN); Baosheng Yuan, Singapore (SG)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 10/148,028

(22) PCT Filed: Sep. 30, 2000

(86) PCT No.: PCT/CN00/00306

§ 371 (c)(1), (2), (4) Date: Jul. 28, 2003

(87) PCT Pub. No.: WO02/29617

PCT Pub. Date: Apr. 11, 2002

(51) Int. Cl.
*G10L 15/14* (2006.01)

(52) U.S. Cl. ...................... 704/256; 704/245; 704/232; 704/231; 704/251; 704/255; 704/256.1; 704/256.2; 704/256.4; 704/256.7; 704/266

(58) Field of Classification Search ................ 704/231, 704/256.7, 256.1, 245, 238, 256.8, 256, 232
See application file for complete search history.

(56) References Cited

U.S. PATENT DOCUMENTS 5,353,408 A * 10/1994 Kato et al. .................. 704/226
5,598,505 A * 1/1997 Austin et al. ................ 704/226
5,710,865 A * 1/1998 Abe .......................... 704/248
5,806,034 A * 9/1998 Naylor et al. ............... 704/256
5,864,810 A * 1/1999 Digalakis et al. ............ 704/255
5,912,989 A * 6/1999 Watanabe ................... 382/228
6,070,140 A * 5/2000 Tran .......................... 704/275
6,526,379 B1 * 2/2003 Rigazio et al. .............. 704/245
6,691,090 B1 * 2/2004 Laurila et al. ............... 704/250

OTHER PUBLICATIONS

Wilpon, Jay G., A Modified K-Means Clustering Algorithm for Use in Isolated Word Recognition, Jun. 1985, IEEE vol. ASSP-33 No. 3, pp. 587-594.*
Sankar, A., Experiments with a Gaussian Merging-Splitting Algorithm for HMM Training for Speech Recognition, Mar. 1998.*

* cited by examiner

*Primary Examiner*—Richemond Dorvil
*Assistant Examiner*—Natalie Lennox
(74) *Attorney, Agent, or Firm*—Blakely, Sokoloff, Taylor & Zafman LLP

(57) ABSTRACT

According to one aspect of the invention, a method is provided in which a mean vector set and a variance vector set of a set of N Gaussians are divided into multiple mean sub-vector sets and variance sub-vector sets, respectively. Each mean sub-vector set contains a subset of the dimensions of the corresponding mean vector set and each variance sub-vector set contains a subset of the dimensions of the corresponding variance vector set. Each resultant sub-vector set is clustered to build a codebook for the respective sub-vector set using a modified K-means clustering process which dynamically merges and splits clusters based upon the size and average distortion of each cluster during each iteration in the modified K-means clustering process.

23 Claims, 5 Drawing Sheets

START 501
500
INITIALIZATION k=0, CREATE INITIAL CODEBOOK 505
k=K? 510
YES END
NO
k=k+1 SPLIT EACH CLUSTER FROM 1 TO 2 CREATE CODEBOOK BASED ON NEW CLUSTERS 515
REASSIGN EACH VECTOR IN THE SUB_VECTOR SET TO THE NEAREST CLUSTER 520
COMPUTE TOTAL DISTORTION CHANGING RATE (TDCR) 525
IS TDCR LESS THAN OR EQUAL TO A FIRST PREDETERMINED THRESHOLD? 527
YES OBTAIN k-bit CODEBOOK 550
NO
DYNAMICALLY MERGE AND SPLIT CLUSTERS BASED UPON THEIR SIZE AND AVERAGE DISTORTION 530
CALCULATE NEW CENTROID FOR EACH CLUSTER 535

METHOD, APPARATUS, AND SYSTEM FOR BUILDING A COMPACT MODEL FOR LARGE VOCABULARY CONTINUOUS SPEECH RECOGNITION (LVCSR) SYSTEM

FIELD OF THE INVENTION

The present invention relates to the field of speech recognition. More specifically, the present invention relates to a method, apparatus, and system for building a compact acoustic model for large vocabulary continuous speech recognition (LVCSR) system.

BACKGROUND OF THE INVENTION

Modern speech recognition systems are based on principles of statistical pattern recognition and typically employ an acoustic model and a language model to decode an input sequence of observations (also referred to as acoustic events or acoustic signals) representing an input speech (e.g., a sentence or string of words) to determine the most probable sentence or word sequence given the input sequence of observations. In other words, the function of a modern speech recognizer is to search through a vast space of potential or candidate sentences and to choose the sentence or word sequence that has the highest probability of generating the input sequence of observations or acoustic events. In general, most modern speech recognition systems employ acoustic models that are based on continuous density hidden Markov models (CDHMMs). In particular, CDHMMs have been widely used in speaker-independent LVCSR because they outperform discrete HMMs and semi-continuous HMMs. In CDHMMs, the probability function of observations or state observation distribution is modeled by multivariate mixture Gaussian (also referred to herein as Gaussian mixtures) which can approximate the speech feature distribution more accurately. However, time-consuming output probability computation and large memory requirement of CDHMMs makes it difficult to implement a real-time LVCSR system. One of the ways to reduce memory requirement and computation cost is to build a smaller system by reducing both the number of mixtures per HMM state and the number of HMM states of the system. However, this method usually introduces unacceptable increase of word error rate (WER) if the parameter size is reduced significantly. Other methods are utilized to speed up state likelihood computation but at the expense of recognition accuracy and increasing memory requirements. Thus, there exists a need to reduce memory requirement and computation cost without degrading the system performance and recognition accuracy.

BRIEF DESCRIPTION OF THE DRAWINGS

The features and advantages of the present invention will be more fully understood by reference to the accompanying drawings, in which.

DETAILED DESCRIPTION

Figure 1:
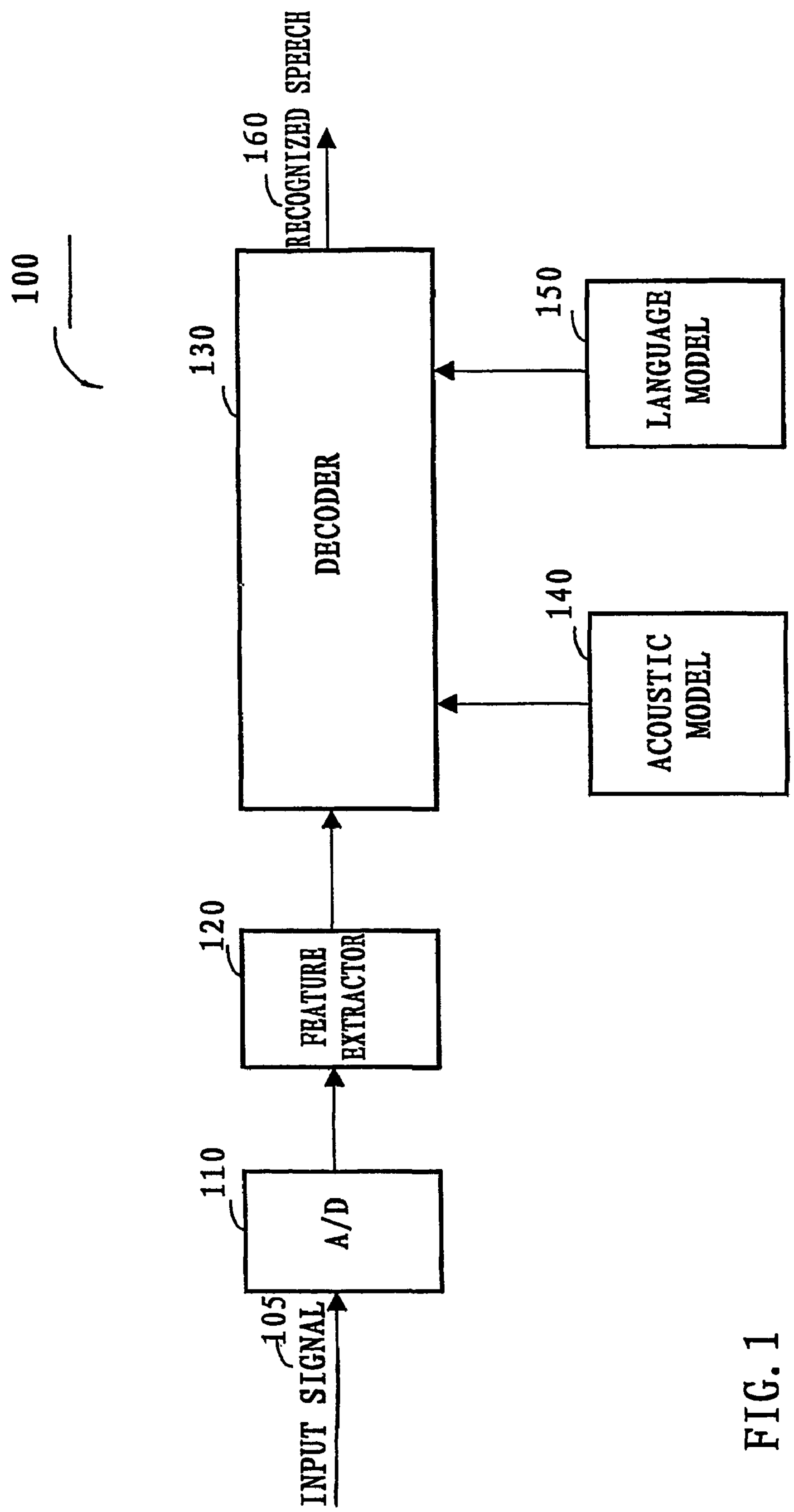
FIG. 1 is a block diagram of one embodiment of a speech recognition system according to the teachings of the present invention.

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, system, and machine-readable medium for building a compact acoustic model for a speech recognition system in order to reduce the memory requirement for storing the acoustic model and the cost in state likelihood computation. In one embodiment, a mean vector set and a variance vector set of a set of Gaussians are divided into multiple mean sub-vector sets and variance sub-vector sets. Each mean sub-vector set and each variance sub-vector set contains a subset of the dimensions of the corresponding mean vector set and variance vector set, respectively. Each resultant sub-vector set is then clustered to build a codebook for the respective sub-vector set using a modified K-means clustering process which dynamically merges and splits clusters based upon the size and average distortion of each cluster during each iteration in the modified K-means clustering process. In one embodiment, the set of Gaussians represents corresponding observation probability functions of previously trained continuous density hidden Markov models (CDHMMs). In one embodiment, the CDHMMs was trained using a speech training set wherein each frame of training speech is represented by a corresponding feature vector having a plurality of feature components. The plurality of feature components, in one embodiment, includes a first stream of Mel-Frequency Cepstral Coefficients (MFCCs), a second stream of the first order derivatives of the MFCCs (also referred to as delta MFCCs), and a third stream of the second order derivatives of the MFCCs (also referred to as delta-delta MFCCs). In one embodiment, each sub-vector set corresponds to a subset of the plurality of feature components. For example, the first sub-vector set may correspond to the first stream of feature components (e.g., MFCCs), the second sub-vector set may correspond to the second stream of feature components (e.g., delta MFCCs), and the third sub-vector set may correspond to the third stream of feature components (delta-delta MFCCs). In one embodiment, the clustering of each sub-vector set is performed as follows. First, an initial codebook for the respective sub-vector set is created using the entire sub-vector set as the initial cluster. A set of clustering operations is then performed until a predetermined number of iterations is reached to create the codebook for the sub-vector set. During each iteration, each cluster in the current cluster set is split into two new clusters and a corresponding codebook is created based upon the resultant clusters using the centroids of the corresponding clusters as the codewords. Each vector in the sub-vector set is then associated or assigned to the nearest cluster in the cluster set. In one embodiment, the vectors are clustered by calculating the distance from each vector to each of the centroids and associating or assigning each respective vector to the nearest centroid. In one embodiment, Bhattacharyya distance measure is used to compute the distance between a vector and a centroid. In one embodiment, a changing rate in total accumulated distance (also referred to as the total distortion reduction rate) is computed during each iteration. If the changing rate in total accumulated distance exceeds a predetermined threshold value, then the clusters in the current cluster set may be merged and split based upon the size and the average distortion of each cluster. Otherwise, the codebook for the current iteration is obtained and the process continues with a new iteration. In one embodiment, the total distortion and the number of associated vectors for each cluster are calculated after the vectors have been assigned to the corresponding clusters as described above. If the number of vectors for a particular cluster is less than a predetermined size, then that particular cluster is merged. In one embodiment, the merging of a cluster is accomplished by removing the centroid of the respective cluster from the codebook and the vectors associated with the respective cluster are reassigned to other clusters. If there is a merged cluster, another cluster that has the maximum average distortion will be split into two clusters. After the dynamic merging and splitting of clusters as described above, the new centroid for each cluster is computed. The process then loops back to reassign all vectors in the sub-vector to the clusters as described above. The teachings of the present invention are applicable to any scheme, method and system for speech recognition that employs CDHMMs in the acoustic model. However, the present invention is not limited to CDHMMs in speech recognition systems and can be applied to the types of acoustic modeling in speech recognition using multi-dimensional feature vectors. In addition, the present invention can also be applied to data modeling in other fields or disciplines including, but not limited to, image processing, signal processing, geometric modeling, computer-aided-design (CAD), computer-aided-manufacturing (CAM), etc.

FIG. 1 illustrates a block diagram of one embodiment of a speech recognition system 100 according to the teachings of the present invention. The system 100, as shown in FIG. 1, includes an analog to digital converter (A/D) 110, a feature extractor or spectral analysis unit 120, a decoder 130, an acoustic model 140, and a language model 150. An input signal 105 representing the input speech is first digitized using the A/D 110. The digital signal is then sliced up into frames typically of 10, 15, or 20 ms. Each frame of the signal is then converted into a corresponding feature vector which is used to characterize the spectral properties of the input signal. In the present embodiment, the feature vector is multi-dimensional and has a plurality of feature components. In one embodiment, the feature components include 12 MFCC components, 12 delta MFCCs, and 12 delta-delta MFCCs. As such the feature vectors have 36 dimensions. The feature vectors generated by the feature extractor unit 120 are then inputted into the decoder 130 which determines the sentence or sequence of words representing recognized speech 160 that has the highest probability given the acoustic events characterized by the feature vectors, based upon the acoustic model 140 and the language model 150. This recognized speech 160 may then be provided for storage and/or communication according to method and techniques well known in the art. The acoustic model 140, in the present embodiment, includes a plurality of sub-vector codebooks. Each codebook corresponds to stream of mean or a stream of variance which is a subset of a mean vector set and a variance vector set, respectively, of a set of N Gaussians that represent the corresponding observation probability functions of previously trained CDHMMs. The acoustic model 140 and the construction of the sub-vector codebooks are described in greater detail below.

Figure 2:
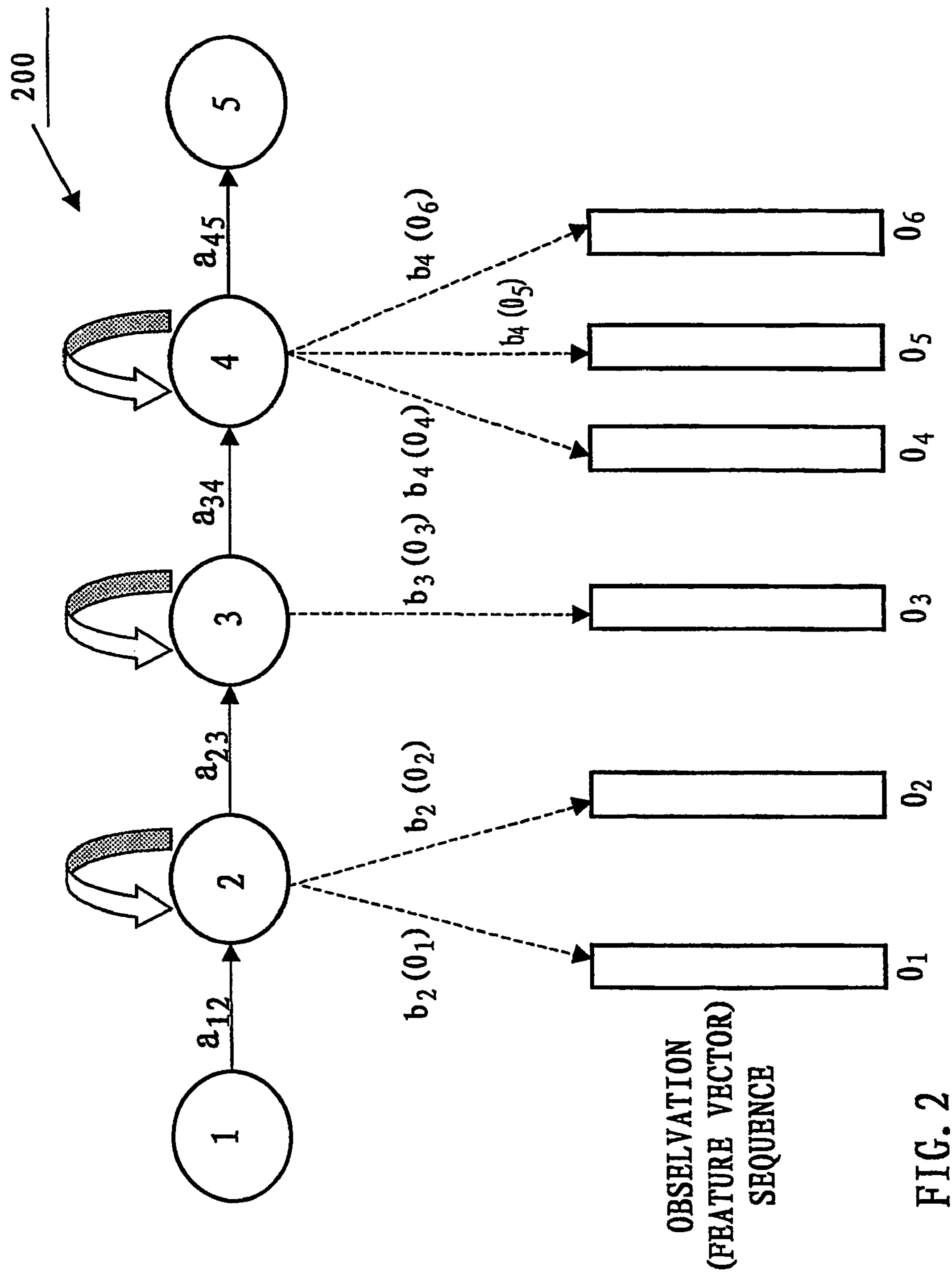
FIG. 2 is a diagram illustrating an HMM-based phone model.

FIG. 2 illustrates a diagram of one embodiment of an HMM-based phone model structure used in the acoustic model 140 to model a phonetic unit (e.g., a phoneme or a subword unit, etc.). Each individual phonetic unit is represented or modeled by a corresponding HMM. As shown in FIG. 2, an HMM has a set of sequence of states (1-5) that are connected by a set of transition probabilities ($a_{12}$, $a_{23}$, $a_{34}$, $a_{45}$), and a set of observation probabilities or likelihoods ($b_2(o_1)$, $b_2(o_2)$, $b_3(o_3)$, $b_4(o_4)$, $b_4(o_5)$, $b_4(o_6)$). Each transition probability $a_{ij}$ represents the probability of transitioning from a state i to a state j. Each observation probability or distribution $b_i(o_j)$ represents the probability of an observation vector $o_j$ being generated from a state i. Thus, the transition probabilities model the durational variability in speech and the output probabilities model the spectral variability. Accordingly, the set of states, the set of transition probabilities and the set of output probabilities are the parameters that are used to define an HMM. The HMM shown in FIG. 2 has a left-right topology. In many modern speech recognition systems, each state output distribution or observation probability function is modeled by a multivariate mixture Gaussian as follows:

$$b_j(o_t) = \sum_{k=1}^{M} c_{jk} N(o_t, m_{jk}, V_{jk})$$

where $c_{jk}$ is the weight of mixture component k in state j and $N(o_t, m_{jk}, V_{jk})$ denotes a multivariate Gaussian of mean $m_{jk}$ and convariance $V_{jk}$ for the kth mixture component in state j. As described above, the use of continuous density HMMs for the acoustic models results in large memory requirement to store the CDHMMs and time-consuming output probability computations. As discussed above and described in greater details below, the present invention provides a method and mechanism for reducing the size of the CDHMM-based acoustic model and the output probability computation cost while maintaining a high level of recognition accuracy.

According to the teachings of the present invention, a method is introduced and described in detail herein to efficiently reduce the acoustic model size and computation cost for LVCSR system based upon CDHMMs. In one embodiment, Bhattacharyya distance measure is used as a criterion to quantize or cluster the mean and variance vectors of Gaussian mixtures that are obtained from the original CDHMMs that were previously trained. To minimize the quantization error, the feature vector is separated into multiple streams such as MFCCs, delta MFCCs, and delta-delta MFCCs and a modified K-means clustering algorithm is applied to each stream to cluster the vectors in each sub-vector set in order to build a corresponding codebook for the respective sub-vector set. The modified K-means algorithm as described in more detail below dynamically merges and splits cluster according to its size and average distortion during each iteration for each cluster. After quantization or clustering, the Gaussian likelihood can be pre-computed only once at the beginning of every frame and their values can be stored in a look up table, so the computation during decoding is greatly reduced as well. As described above, in one embodiment, the front-end feature used in the system is a 36-dimensional feature vector including 12 MFCCs, 12 delta-MFCCs and 12 delta-delta MFCCs. Thus the mean vector set and variance set of the Gaussian mixtures comprise 36-dimensional mean vectors and variance vectors, respectively. In other words, the mean vector set and the variance vector set comprise three streams of feature components. Each of these three streams or sub-vector set will be processed separately as described in more detail below to create a corresponding codebook for the respective stream or sub-vector set. In one embodiment, since it is well known that the Gaussian mixtures are very sensitive to any perturbation in the value of their means, the mean of Gaussian mixtures is quantized with more codewords to minimize the quantization error. On the other hand, since the variance is less sensitive, fewer codewords may be used for the variance.

To quantize or cluster the mean and variance of Gaussian mixtures, a separate codebook is designed and built for every stream of mean and variance. The design criteria is to minimize the total distortion between the centroid vectors of the codebook and the original vectors. In one embodiment, for a given mean or variance vector, there are three indexes which point to corresponding codeword in each stream codebook, the three codewords identified can be combined to represent the given mean or variance.

As discussed above, in one embodiment, to cluster the vectors in a given sub-vector set, the Bhattaacharyya distance measure is used to compute the distance or distortion between two vectors. For example, given two Gaussian mixtures: $N(x; \mu_1, \Sigma_1)$ and $N(x; \mu_2, \Sigma_2)$, distortion between them is computed using Bhattacharyya distance, defined as below:

$$D_{bhat} = \frac{1}{8}(\mu_2 - \mu_1)^T \left[ \frac{\sum_1 + \sum_2}{2} \right]^{-1} (\mu_2 - \mu_1) + \frac{1}{2} \ln \frac{\left| \frac{\sum_1 + \sum_2}{2} \right|}{\sqrt{|\sum_1||\sum_2|}} \quad (1)$$

where $\mu_1$ and $\mu_2$ are the mean vectors of the two Gaussian mixtures, $\Sigma_1$ and $\Sigma_2$ are the variance matrices of the two Gaussian mixtures.

As described herein, the mean and variance of Gaussian mixtures are quantized separately. For variance quantization, it is assumed that the mean vector is the same for all Gaussian mixtures. So the distortion measure (1) becomes:

$$D_{bhat} = \frac{1}{2} \ln \frac{\left| \frac{\sum_1 + \sum_2}{2} \right|}{\sqrt{|\sum_1||\sum_2|}} \quad (2)$$

Equation (2) is used as the distance measure between two variance vectors. For mean quantization, it is assumed that the variance is the same for all Gaussian mixtures, so (1) becomes:

$$D_{bhat} = G_1(\mu_2 - \mu_1)^T(\mu_2 - \mu_1) + G_2 \quad (3)$$

where $G_1$ and $G_2$ are constants and can be ignored in distance measure as shown below:

$$D_{bhat} = (\mu_2 - \mu_1)^T(\mu_2 - \mu_1) \quad (4)$$

Accordingly, equation (4) can be used as the distance measure between two mean vectors.

Except for the distance measure as described above, the clustering algorithm or method is the same for the mean and variance of Gaussians. Accordingly, the clustering method is described below with respect to the clustering of mean vector set of the Gaussian mixtures although everything being discussed herein should be equally applicable to the clustering of the variance vector set.

Figure 3:
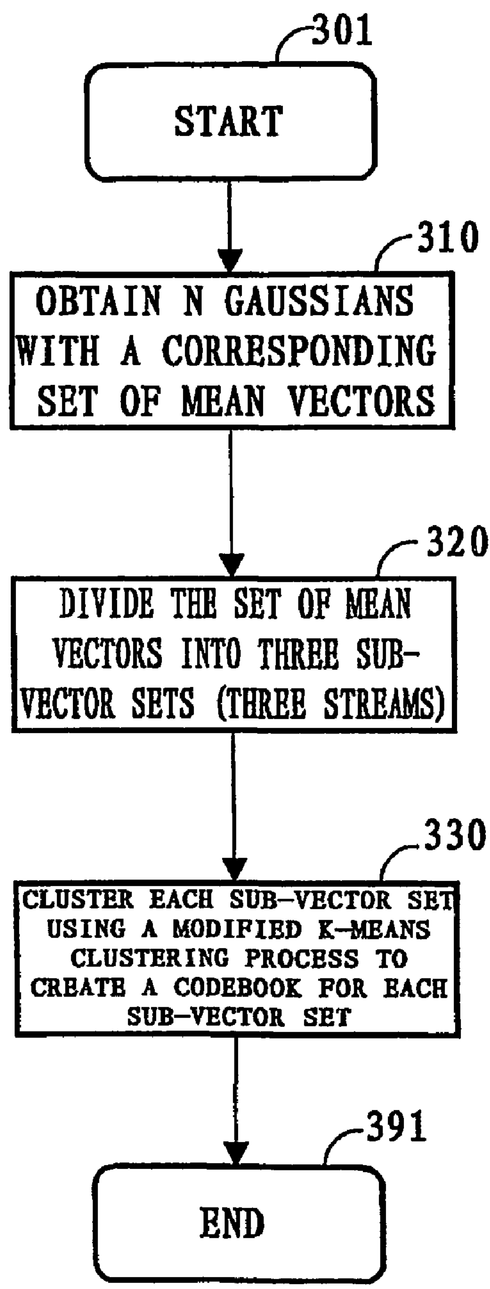
FIG. 3 shows a flow diagram of one embodiment of a method according to the teachings of the present invention.

FIG. 3 illustrates a flow diagram of one embodiment of a method 300 according to the teachings of the present invention. The method 300 starts at block 301 and proceeds to block 310 to obtain a set of N Gaussians with a corresponding set of mean vectors $M=\{m_1, \ldots, m_N\}$. As described above, the set of N Gaussians can be obtained through CDHMM training using a training set of speech. At block 320, the set of mean vectors (also referred to as mean vector set herein) is divided into three streams and obtain three mean sub-vector sets as follows:

$$M_1=\{m_{11}, \ldots, m_{1N}\},$$

$$M_2=\{m_{21}, \ldots, m_{2N}\},$$

$$M_3=\{m_{31}, \ldots, m_{3N}\}$$

such $$m_i = \begin{pmatrix} m_{1i} \\ m_{2i} \\ m_{3i} \end{pmatrix},$$

$i=1, \ldots, N$

In one embodiment, each mean sub-vector set corresponds to a subset or stream of the feature components (e.g., MFCCs, delta MFCCs, delta-delta MFCCs). While the means vector is divided into three sub-vector sets in the present embodiment, it should be appreciated and understood by one skilled in the art that the teachings of the present invention are not limited to any particular number of sub-vector sets. The mean vector set (as well as the variance vector set) can be divided into other numbers of sub-vector sets, depending upon the particular applications and implementations of the present invention. At block 330, each sub-vector set $M_i$ is clustered or quantized using a modified K-means clustering process to build a K-bit codebook for the respective sub-vector set. Accordingly, there are $2^K$ codewords in the K-bit codebook. The modified K-means clustering process is described in more details below.

Figure 4:
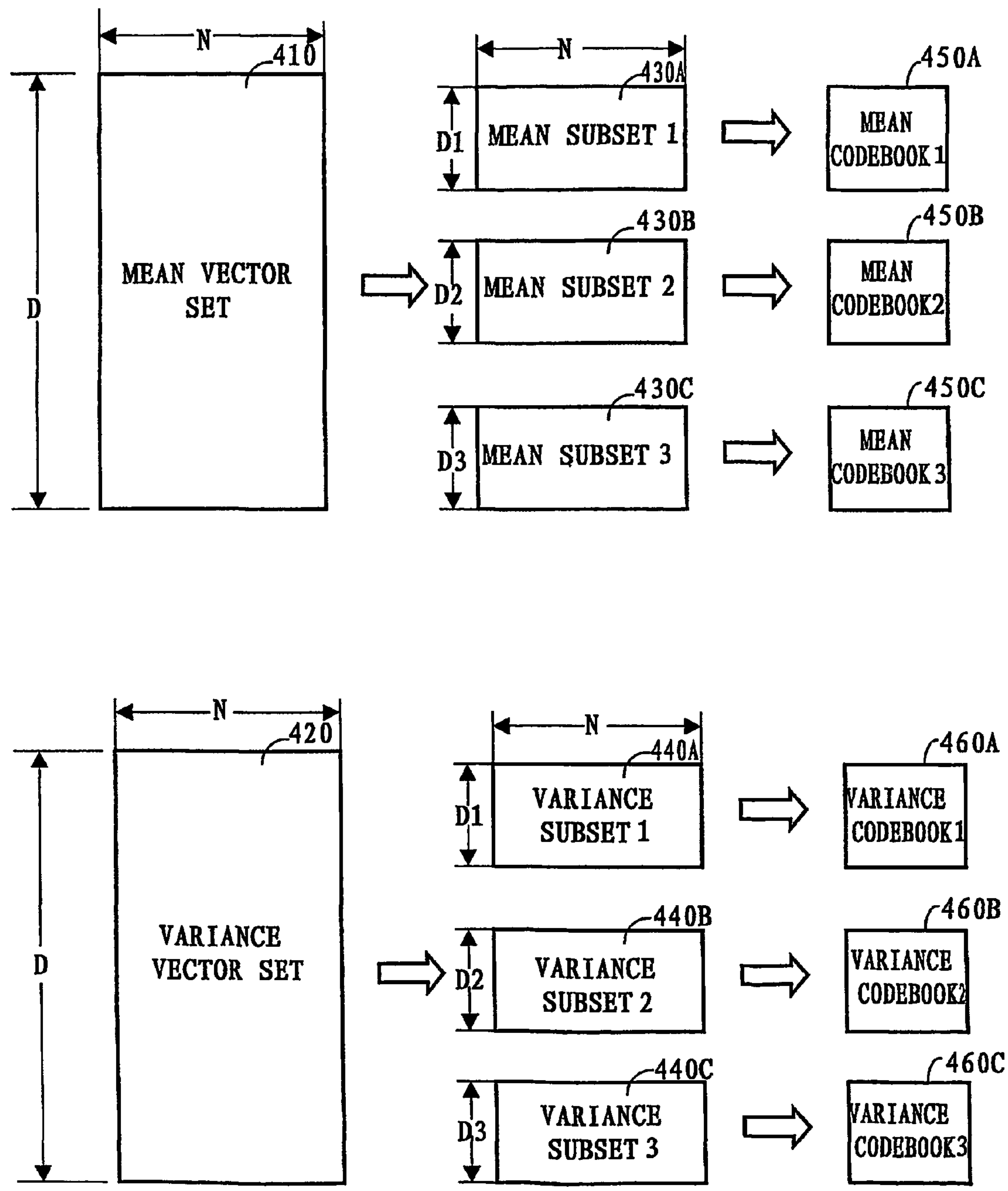
FIG. 4 shows a block diagram of one embodiment of a method according to the teachings of the present invention.

FIG. 4 shows a block diagram of one embodiment of a method according to the teachings of the present invention. As shown in FIG. 4, each of the mean vector set 410 and the variance vector set 420 are divided into three sub-vector sets. Each of the mean sub-vector (430A-C) set corresponds to a subset of the dimension (or feature components) of the mean vector set. Likewise, each of the variance sub-vector set (440A-C) corresponds to a subset of the dimensions (or feature components) of the variance vector set. Each of the sub-vector set is then clustered or vector-quantized using the modified K-means clustering process to create a corresponding codebook for each respective sub-vector set. As noted above, the size of the codebook for the mean sub-vector set and the size of code book for the variance sub-vector set may be different. In the present embodiment, as discussed above, more codewords are used to quantize the mean of the Gaussian mixtures to minimize quantization error and fewer codewords are used to quantize the variance.

Figure 5:
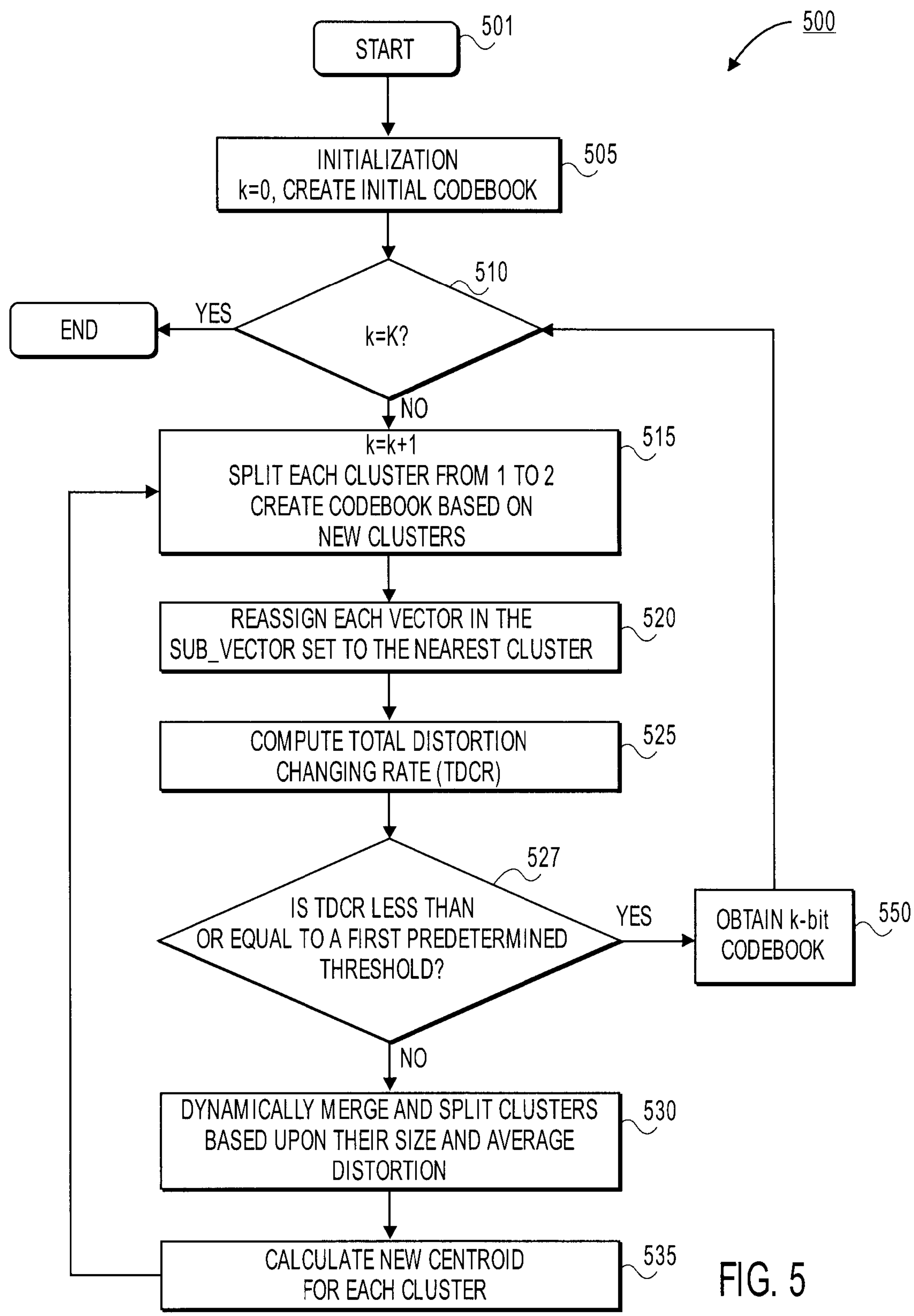
FIG. 5 illustrates a flow diagram of one embodiment of a modified K-means clustering process according to the teachings of the present invention.

FIG. 5 illustrates a flow diagram of one embodiment of a modified K-means clustering process 500 to create a K-bit codebook for a sub-vector set (e.g., mean sub-vector set or variance sub-vector set), according to the teachings of the present invention. The process 500 starts at block 501 and proceeds to block 505 to create an initial codebook for the sub-vector set as follows:

At block 505: Initialization of the process is performed by setting the codebook bit (also called counter value) k=0. The centroid of $M_1$ is computed. The centroid is denoted as $c_j$, $j=1, \ldots, 2^k$ At this point, the entire sub-vector set is considered the initial cluster.

At block 510: the counter value k is compared with K to determine whether the K-bit codebook for the sub-vector set has been obtained. If k=K, the K-bits codebook has been obtained, the clustering process 500 proceeds to end at block 591. Otherwise, the process 500 proceeds to block 515.

At block 515: the cluster set is split as follows:

$$k=k+1$$

split each cluster $C_j$, j=1, . . . , $2^{k-1}$ from 1 to 2 as shown below:

compute the average variance to the centroid $c_j$ for all the vectors in this cluster, denotes it as $\delta_j$ create two new centroids:

$$c_j^1=c_j+0.5\cdot\delta_j \tag{5}$$

$$c_j^2=c_j-0.5\cdot\delta_j \tag{6}$$

combine all centroids to build k-bits codebook $\{c_1, \ldots c_{2^k}\}$ initialize $D_1=1e^{-20}$ The process 500, after splitting the clusters, proceeds to block 520 to associate or assign each vector in the sub-vector set to an appropriate cluster as shown below:

At block 520: For each $m_{il}\in M_i$, l=1, . . . , N, associate it to the nearest centroid, such that $$n(1)=\arg\min_{s=1, \ldots 2^k} d(m_{il}, c_s) \tag{7}$$

where $d(m_{il}, c_s)$ is the distance measure between $m_{il}$ and $c_s$.

At block 525: compute the total distances for all vectors as shown below:

$$D_2=\sum_{l=1}^{N} d(m_{il}, c_{n(l)}) \tag{8}$$

At block 527: if $|D_1-D_2|/D_1\leqq\theta$, where θ is the pre-defined threshold, the process 500 loops back to block 515. Otherwise, the process 500 proceeds to block 530 to dynamically merge and split clusters as follows:

At block 530: merging and splitting

Calculate the total distortion $DT_i$ and the number of associated vectors $N_i$ for each cluster $CL_i$, i=1, . . . $2^k$ merging: if $N_n<\phi$, the cluster $CL_n$ is merged (the centroid of the cluster is removed from the codebook and the vectors in the merged cluster are reassigned to other clusters) n=1, . . . , $2^k$.

ϕ is pre-defined threshold.

splitting: if there is a merged cluster, then another cluster which has the maximum average distortion is split as follows:

If there is a merged cluster, the cluster that has the maximum average distortion $CL_m$ as determined by equation (9) shown below is selected to be split according to the splitting operations described at block 515 above.

$$m=\arg\max_{i=1, \ldots 2^k} DT_i/N_i \tag{9}$$

The process 500 then proceeds from block 530 to block 535. At block 535: compute new centroid for each cluster, copy the new centroids into old ones, set $D_1=D_2$, then loop back to block 520. In one embodiment, if there are $l_i$ vectors in cluster i, then the centroid for cluster i is computed as shown below:

$$C_i=\frac{1}{l_i}\sum_{k=1}^{l_i} m_{i_k}$$

The modified K-means clustering algorithm as described above can guarantee to converge to a local minimum of the overall distortion.

Significant reduction in memory requirements for a CDHMM-based acoustic model can be attained according to the teachings of the present invention. For example, assuming that the acoustic model is a CDHMM-based system which has 6000 states and 12 Gaussian mixtures in each state, then there are 6000*12=72000 mixtures to be stored. If the feature vector dimension is 36, then the memory requirement for storing these mixtures is calculated as follows:

6000(states)*12(mixtures)*2(mean and variance)*36(dimension)*4(float)=20 Mb

After the clustering or quantization according to the teachings of the present invention, a codebook for each stream of mean and variance and corresponding indexes need to be stored. Assuming that there are 8192 codewords for each stream of mean set and 256 codewords for each stream of variance set, then the memory requirement after quantization is calculated as follows:

Codebook size:

256(codewords for variance)*3(streams)*12(stream dimensions)*4(float)+

8192(codewords for mean)*3(streams)*12(stream dimensions)*4(float)=1.2 Mb

Index:

6000(states)*12(mixtures)*2(mean and variance)*3 (streams)*2(index, unsigned int) =864 Kb Total: 1.2 Mb+864 Kb=2.064 Mb For every mean and variance vector, in one embodiment, the system just needs to store the indexes which point to the corresponding codewords.

Computation Reduction

In decoding process, most of computations are consumed on the computation of state observation probability. For a given Gaussian mixture with mean vector μ and a variance matrix $C=\mathrm{diag}(\sigma_1, \ldots, \sigma_M)$, and a given observation vector x, the log likelihood of this Gaussian mixture can be computed as follow:

$$\log N(x; \mu, C)=G+(X-\mu)^T C^{-1}(x-\mu)=G+\|Dx-D\mu\|^2$$

where G is a constant, $D=C^{-1/2}$. Dμ is independent of X, so it can be pre-computed and stored in a lookup table, Dx is a vector multiply operation which need to be computed for each variance, so after quantization, this computation will be greatly reduced (256 codewords for each stream instead of 72000 variance vectors). During decoding, for every frame this log likelihood can be pre-computed only once at the beginning. The computation is therefore greatly reduced during the decoding process.

The invention has been described in conjunction with the preferred embodiment. It is evident that numerous alternatives, modifications, variations and uses will be apparent to those skilled in the art in light of the foregoing description.

What is claimed is:

1. A computer implemented method comprising:

dividing a mean vector set having a plurality of dimensions into multiple mean sub-vector sets, the mean vector set including a mean vector of one of a set of N Gaussians, wherein the mean vector contributes only a sub-vector of the mean vector to one of the mean sub-vector sets, and wherein a set of all dimensions of the one of the mean sub-vector sets includes only a subset of the plurality of dimensions of the mean vector set;

dividing a variance vector set having a plurality of dimensions into multiple variance sub-vector sets, the variance vector set including a variance vector of one of the set of N Gaussians, wherein the variance vector contributes only a sub-vector of the variance vector to one of the variance sub-vector sets, and wherein a set of all dimensions of the one of the variance sub-vector sets includes only a subset of the plurality of dimensions of the variance vector set;

clustering each resultant sub-vector set to build a codebook for the respective sub-vector set according to a modified K-means clustering process which, during an iteration of the modified K-means clustering process, dynamically assigns each sub-vector in the respective sub-vector set to a respective cluster in a current cluster set, based upon a size of a particular cluster in the current cluster set, reassigns each sub-vector assigned to the particular cluster to another cluster in the current cluster set, and removes the particular cluster from the current set of clusters to create a new cluster set, and splits a cluster in the new cluster set based upon an average distortion of the cluster in the new cluster set;

decoding information related to a speech signal using said clustered sub-vector sets; and providing a set of one or more words corresponding to the speech signal based on the decoded information.

2. The method of claim 1 wherein the N Gaussians represent corresponding observation probability functions of previously trained continuous density hidden Markov models (CDHMMs).

3. The method of claim 2 further comprising:

training the CDHMMs using a training set of speech wherein each frame of training speech is represented by a corresponding feature vector having a plurality of feature components.

4. The method of claim 3 wherein the plurality of feature components comprises a first stream of Mel-Frequency Cepstral Coefficients (MFCCs), a second stream of the first order derivatives of the MFCCs (delta MFCCs), and a third stream of the second order derivatives of the MFCCs (delta-delta MFCCs).

5. The method of claim 4 wherein each sub-vector set corresponds to a subset of the plurality of feature components.

6. The method of claim 5 wherein the mean vector set and the variance vector set each is divided into three sub-vector sets, respectively, each respective sub-vector set corresponds to a distinct stream of the feature components.

7. The method of claim 1 wherein the modified K-means clustering process further creates an initial codebook for the respective sub-vector set using the entire sub-vector set as the initial cluster; and performs the iteration until a predetermined number of iterations is performed, the iteration further to dynamically:

split each cluster in a previous cluster set into two new clusters, the splitting to form the current cluster set, create a corresponding codebook based upon the current cluster set, and compute a centroid for each cluster in the new cluster set.

8. The method of claim 7 wherein creating the initial codebook comprises: computing the centroid of the entire sub-vector set.

9. The method of claim 7 wherein the modified K-means clustering process further determines whether the predetermined number of iterations is reached.

10. The method of claim 9 wherein splitting each cluster in a previous cluster set comprises:

computing, for all sub-vectors in the respective cluster, the average variance to the centroid of the respective cluster; and creating two new centroids based upon the centroid of the respective cluster and the average variance computed.

11. The method of claim 10 further comprising:

combining all centroids that have been created thus far to build the corresponding codebook; and initializing the value of the total accumulated distance to a predetermined value.

12. The method of claim 11 wherein assigning each sub-vector in the respective sub-vector set to a respective cluster in a current cluster set comprises comprises:

calculating the distance from the respective sub-vector to each of the existing centroids; and associating the respective sub-vector with the nearest centroid.

13. The method of claim 12 wherein Bhattacharyya distance is used as a distance measure.

14. The method of claim 12 wherein the iteration of the modified K-means clustering process further calculates the total distortion and number of associated sub-vectors for each cluster;

wherein reassigning each sub-vector assigned to the particular cluster and removing the particular cluster from the current set of clusters based upon a size of a particular cluster comprises reassigning and removing for each cluster whose number of associated sub-vectors is less than a predetermined size; and wherein splitting a cluster in the new cluster set comprises splitting a cluster in the new cluster set that has the maximum average distortion, where the new cluster set was created upon the merging of a cluster.

15. A system for speech recognition comprising: an acoustic model comprising:

a first plurality of codebooks, each codebook of the first plurality of codebooks being built based upon a mean sub-vector set of a mean vector set, the mean vector set having a plurality of dimensions, the mean vector set including a mean vector of one of a set of N Gaussians that represents state observation probability distributions of previously trained continuous density hidden Markov models (CDHMMs), wherein the mean vector contributes only a sub-vector of the mean vector to the mean sub-vector set, and wherein a set of all dimensions of the mean sub-vector set includes only a subset of the plurality of dimensions of the mean vector set, a second plurality of codebooks, each codebook of the second plurality of codebooks being built based upon a variance sub-vector set of a variance vector set, the variance vector set having a plurality of dimensions, the variance vector set including a variance vector of one of a set of N Gaussians that represents state observation probability distributions of previously trained continuous density hidden Markov models (CDHMMs), wherein the variance vector contributes only a sub-vector of the variance vector to the variance sub-vector set, and wherein a set of all dimensions of the variance sub-vector set includes only a subset of the plurality of dimensions of the variance vector set, each codebook being built according to a modified K-means clustering process which, during an iteration of the modified K-means clustering process, dynamically assigns each sub-vector in a respective sub-vector set to a cluster in a current cluster set, based upon a size of a particular cluster in the current cluster set, reassigns each sub-vector assigned to the particular cluster to another cluster in the current cluster set, and removes the particular cluster from the current cluster set to create a new cluster set, and splits a cluster in the new cluster set based upon an average distortion of the cluster in the new cluster set;

a feature extraction unit to convert an input signal representing an input speech into a set of feature vectors each representing a corresponding frame of the input signal; and a decoder coupled to the acoustic model and the feature extraction unit, the decoder to provide a set of one or more words corresponding to the input speech based, at least in part, upon the feature vectors and the acoustic model.

16. The system of claim 15 wherein the mean vector set and the variance vector set each is divided into three sub-vector sets, the first sub-vector set corresponding to a stream Mel-Frequency Cepstral Coefficients (MFCCs), the second sub-vector set corresponding to the first order derivatives of the MFCCs (delta MFCCs), and the third sub-vector set corresponding to a stream of the second order derivatives of the MFCCs (delta-delta MFCCs).

17. The system of claim 15 wherein the modified K-means clustering process further creates an initial codebook for the respective sub-vector set using the entire vector set as the initial cluster; and performs the iteration until a predetermined number of iterations is performed, the iteration further to dynamically:

split each cluster in a previous cluster set into two new clusters, the splitting to form the current cluster set, create a corresponding codebook based upon the current cluster set, and compute a centroid for each cluster in the new cluster set.

18. The system of claim 17 wherein splitting each cluster in a previous cluster set into two new clusters comprises:

computing the average variance to the centroid of the respective cluster for all sub-vectors in the respective cluster;

creating two new centroids based upon the centroid of the respective cluster and the average variance computed; and combining all centroids that have been created thus far to build the corresponding codebook for the current iteration.

19. The system of claim 18 wherein assigning each sub-vector in the respective sub-vector set to a respective cluster in a current cluster set comprises:

calculating the distance from the respective sub-vector to each of the centroids and associating the respective sub-vector with the nearest centroid; and wherein the iteration of the modified K-means clustering process further calculates the total distortion and number of associated sub-vectors for each cluster;

wherein reassigning each sub-vector assigned to the particular cluster and removing the particular cluster from the current set of clusters based upon a size of a particular cluster comprises reassigning and removing for each cluster whose number of associated sub-vectors is less than a predetermined size; and wherein splitting a cluster in the new cluster set comprises splitting a cluster in the new cluster set that has the maximum average distortion where the new cluster set was created upon the merging of a cluster.

20. A machine-readable medium comprising instructions which, when executed by a machine, cause the machine to perform operations for speech recognition comprising:

dividing a mean vector set having a plurality of dimensions into multiple mean sub-vector sets, the mean vector set including a mean vector of one of a set of N Gaussians, wherein the mean vector contributes only a sub-vector of the mean vector to one of the mean sub-vector sets, and wherein a set of all dimensions of the one of the mean sub-vector sets includes only a subset of the plurality of dimensions of the mean vector set;

dividing a variance vector set having a plurality of dimensions into multiple variance sub-vector sets, the variance vector set including a variance vector of one of the set of N Gaussians, wherein the variance vector contributes only a sub-vector of the variance vector to one of the variance sub-vector sets, and wherein a set of all dimensions of the one of the variance sub-vector sets includes only a subset of the plurality of dimensions of the variance vector set;

clustering each resultant sub-vector set to build a codebook for the respective sub-vector set according to a modified K-means clustering process which, during an iteration of the modified K-means clustering process, dynamically assigns each sub-vector in the respective sub-vector set to a cluster in a current cluster set, based upon a size of a particular cluster in the current cluster set, reassigns each sub-vector assigned to the particular cluster to another cluster in the current cluster set, and removes the particular cluster from the current cluster set to create a new cluster set, and splits a cluster of the new cluster set based upon an average distortion of the cluster of the new cluster set;

decoding information related to a speech signal using said clustered sub-vector sets; and providing a set of one or more words corresponding to the speech signal based on the decoded information.

21. The machine-readable medium of claim 20 wherein the mean vector set and the variance vector set each is divided into three sub-vector sets, respectively, each respective sub-vector set corresponds to a distinct stream of feature components.

22. The machine-readable medium of claim 20 wherein the modified K-means clustering process further creates an initial codebook for the respective sub-vector set using the entire sub-vector set as the initial cluster; and performs the iteration until a predetermined number of iterations is performed, the iteration further to dynamically:

split each cluster in a previous cluster set into two new clusters, the splitting to form the current cluster set, create a corresponding codebook based upon the current cluster set, and compute a centroid for each cluster in the new cluster set.

23. The machine-readable medium of claim 22 wherein the iteration of the modified K-means clustering process further calculates the total distortion and number of associated sub-vectors for each cluster;

wherein reassigning each vector assigned to the particular cluster and removing the particular cluster from the current set of clusters based upon a size of a particular cluster comprises reassigning and removing for each cluster whose number of associated vectors is less than a predetermined size wherein splitting a cluster in the new cluster set comprises splitting a cluster in the new cluster set that has the maximum average distortion, where the new cluster set was created upon the merging of a cluster.

* * * * *